United States Patent
Etayo Garralda et al.

(10) Patent No.: US 8,153,176 B2
(45) Date of Patent: Apr. 10, 2012

(54) BIODEGRADABLE PROTEIN BASED THERMOSET COMPOSITIONS, PREPARATION METHODS AND APPLICATIONS THEREOF

(75) Inventors: Vicente Etayo Garralda, Tajonar (ES); Ion Iñaki Garcia Martinez, Pamplona (ES)

(73) Assignee: Naturin GmbH & Co., Weinheim (DE)

(*) Notice: Subject to any disclaimer, the term of this patent is extended or adjusted under 35 U.S.C. 154(b) by 802 days.

(21) Appl. No.: 12/282,564

(22) PCT Filed: Mar. 13, 2006

(86) PCT No.: PCT/EP2006/002267
§ 371 (c)(1),
(2), (4) Date: Sep. 11, 2008

(87) PCT Pub. No.: WO2007/104323
PCT Pub. Date: Sep. 20, 2007

(65) Prior Publication Data
US 2009/0041907 A1    Feb. 12, 2009

(51) Int. Cl.
*A23J 3/04* (2006.01)
(52) U.S. Cl. ........ 426/104; 426/656; 426/240; 426/241; 426/244; 426/245
(58) Field of Classification Search .................. 426/104, 426/656, 240, 241, 244, 245
See application file for complete search history.

(56) References Cited

U.S. PATENT DOCUMENTS

| | | | |
|---|---|---|---|
| 3,891,774 A | 6/1975 | Baker et al. | |
| 6,455,083 B1 | 9/2002 | Wang | |

FOREIGN PATENT DOCUMENTS

| | | |
|---|---|---|
| DE | 19712400 | 10/1998 |
| EP | 0 421 450 | 4/1991 |
| EP | 9 910 961 | 4/1999 |
| EP | 1 692 946 | 8/2006 |
| ES | 2001119 | 4/1988 |
| GB | 2 395 416 | 5/2004 |
| JP | 62181741 | 8/1987 |
| JP | 63099914 | 5/1988 |
| JP | 1156047 | 6/1989 |
| JP | 3124800 | 5/1991 |
| JP | 3195800 | 8/1991 |
| JP | 4226538 | 8/1992 |
| JP | 5132868 | 5/1993 |
| JP | 5222681 | 8/1993 |
| JP | 6017378 | 1/1994 |
| JP | 6330472 | 11/1994 |
| JP | 9104841 | 4/1997 |
| JP | 10212675 | 8/1998 |
| WO | WO 94/22315 | 10/1994 |
| WO | WO 00/13521 | 3/2000 |

*Primary Examiner* — Anthony Weier
(74) *Attorney, Agent, or Firm* — Notaro, Michalos & Zaccaria P.C.

(57) ABSTRACT

The present invention relates to biodegradable protein based thermoset compositions formulated from a powder of a dry and finely ground protein material, from which the water has been thoroughly removed, an anhydrous and liquid alcohol and other optional additives. The inventions also relates to the method for obtaining these compositions in which the components are homogeneously mixed, under controlled conditions of temperature and moisture, to obtain a homogenous and shelf-cohesive mass, that can be shaped in any predetermined form by diverse molding methods, being readily set through the application of a certain amount of heat during a short period of time, which enables it to turn into a solid shaped body or article through a very simple process.

31 Claims, No Drawings

BIODEGRADABLE PROTEIN BASED THERMOSET COMPOSITIONS, PREPARATION METHODS AND APPLICATIONS THEREOF

TECHNICAL FIELD OF THE INVENTION

The invention relates to plastic biodegradable compositions for use in preparing shaped articles by diverse molding methods, and characterised by having thermoset behaviour. More specifically, the invention relates to a biodegradable protein based thermoset compositions comprising a homogenous mixture of an essentially dry protein or protein-based powder and an anhydrous and liquid alcohol, the shaped bodies formed from said compositions and preparation methods thereof.

BACKGROUND OF THE INVENTION

Until now, several proposals have been brought out in order to utilize proteins from both vegetal and animal origin, as a renewable source of polymeric raw materials to make compositions which have a thermoplastic behaviour and, consequently, are able to perform like a thermoplastic under the high temperature and shear forces exerted by an extruder in a conventional process of extrusion-cooking or injection molding. Many shaped articles are thereby obtained what witnesses the great interest in substituting, as primary raw materials, the known synthetic petroleum derived thermoplastics (as for instance PET, PVC, PA, PP, PS, HDPE, LDPE etc.) in some of their performances, by other environmentally friendly materials which are save for humans, animals and the environment. Films, food containers, pet chews, cutlery and warehouse articles are some of the actual commodities whose formerly plastic raw forming material is being currently supplanted by new protein-based thermoplastic compositions to make them edible and/or biodegradable.

There are several patent documents which are representative of the mentioned technologies as, for example, U.S. Pat. No. 4,076,846, where an edible, water-soluble thermoplastic molding composition is proposed, comprising a starch material, a plant or animal derived protein salt or mixtures thereof, water, an edible plasticizer, an edible lubricant and other additives which are mixed up while heating and, afterward, introduced into the heated barrel of an extruder where the composition is mixed under pressure and then extruded through a die, to render a film, or subsequently injected into a mold to obtain a shaped article.

The document U.S. Pat. No. 5,397,834 proposes a biodegradable water-resistant and edible thermoplastic composition made up by aldehyde-starch and proteins either from plant (zein) or animal source, utilizing water as a plasticizer and some other substances as glycerine and polyols; the patent of the same author, U.S. Pat. No. 5,523,293, describes a thermoplastic composition based on soy protein (combined or not with other plant or animal proteins) compounded by mixing a soy protein isolate with water, a plasticizer, a starch and a reducing agent.

The document U.S. Pat. No. 5,569,482 describes a process for producing an edible proteinaceous film by extruding within a biaxial extruder a melted compound of protein (soya) and water along with alternative additives such as plasticizers, a saccharide, fat and oils.

In the document DE19712400 a homogeneous hydroplastic mass is obtained by submitting a mixture of collagen powder and water to elevated temperatures and shear forces inside a extruder and processed to obtain a granulate, strands or sheets.

In the document ES2001119 a thermoplastic material, on the base of a raw material substantially constituted by scraps of tanned hides from the footwear industry, is obtained by subjecting the coarsely particulated hides to a high static pressure of between 200-900 bar inside a mold, followed by heating until reaching, under the same initial or lower pressure, the temperature of 50 to 250° C.

The document U.S. Pat. No. 5,922,379 brings out a biodegradable protein/starch/natural cellulosic fiber thermoplastic composition where the use of cellulosic fibers (including crosslinkers) as reinforcement therein, reduce the overall composition cost and enhance toughness, thermal and strength properties and water resistance. In the patent of the same author, U.S. Pat. No. 6,379,725, there is proposed a protein-based thermoplastic composition containing a mixture of plant and animal derived proteinic material along with water (up to 16 wt %), edible plasticizer and various additive and nutrient ingredients, which by injection molding renders solid articles with possess properties close to those of synthetic polymers such as good strength and hardness. In the patent of the same author, U.S. Pat. No. 6,455,083, an edible thermoplastic composition comprising a mixture of plant and animal derived protein, starch, water (up to 20 wt %), edible fiber and metallic salt hydrate along with edible plasticizers and a variety of additives is described.

The document WO0183597 proposes a biodegradable zein thermoplastic resin made up by zein protein and fatty acids which is thermically transformable into shaped articles.

The document WO0145517 describes an edible thermoplastic made of a mixture of both plant and animal derived proteins along with starch, water, edible cellulose fiber and other additives to be transformed into pet chews by injection molding.

The document U.S. Pat. No. 5,665,152 provides a method of forming a non-edible biodegradable grain protein-based solid, which is the extrusion product of a resin (POLYTRITICUM) basically formulated from soy protein isolates and concentrates, wheat and corn gluten and mixtures thereof, along with a minor amount of water (up 14% by weight), starch, plasticizers and a reducing agent to improve the rheology and final properties, and extruding the mixture under heating and share avoiding the temperature within the extruder barrel to overpass 80° C.

In the patent application US20020119224, a variety of resins, including starch, proteins (casein, denatured or partially hydrolized collagen), thermoplastic polymers such as poly (ethylene acrylic acid) and poly (ethylene vinyl alcohol) and mixtures thereof, are combined along with water, a multiplicity of additives, amongst them rawhides, to obtain, by extrusion or injection molding, a molded animal chew toy.

All the techniques above described are intended to fabricate shaped articles on the base of proteinic materials by formulating compositions which are capable of having a thermoplastic-like behaviour when undergoing a process of extrusion-cooking, from which high temperatures and shear forces are suffered by said compounded formulations, for the necessary period of time to render a melted homogeneous plastic-like material, what allows its further conformation into shaped bodies by pressing it through a slotted die or by injecting it into a mold.

Apart from the need of applying important amounts of heating during the mixture preparation and extrusion-cooking process, there is sometimes necessary, in addition, to heat the molds and, in either case after the extruding or molding processes it will be always necessary to coot the shaped mass below its glass transition temperature for the melt to solidify and thus to obtain a solid body before the unmolding process.

The cost of energy, in terms of the spent power to drive the process, and the needed heat applied in the successive steps of the same, linked to the different outputs, which respectively depends on the mass rheology and the kind of mold processing, determines the efficiency of this kind of techniques. The flowability of melted proteinic compounds within the extrusion molding equipments is mostly lower than that of synthetic polymers under similar conditions. Therefore the output of protein-based compound processing is generally low as compared with the conventional plastics.

Until now, molding techniques that are intended to utilize natural polymers, like proteins, as a renewable raw material to substitute plastics in forming utilities, are based on the thermoplastic ability of that natural polymeric materials under certain physical conditions (extrusion-cooking) and linked to the presence of certain coadjuvant substances (fundamentally water).

Moreover, in the particular case of collagen protein, other kinds of processes to transform collagen or collagen-rich raw materials into molded or coated utilities having an artificial, leather-like surface are those which consist of melting the powdered leather or isolated collagen along with a synthetic polymer. The processes so far described in the literature for producing leather-like products on the basis of natural polymer materials such as collagen are limited to the procedure of blending the collagen-powder (obtained by different techniques) with the synthetic resins by submitting the mixture to the melting temperature of the thermoplastic resin or to the curing conditions of a thermoset resin.

Powdered scraps of natural leather or collagen-rich by-products (splits) coming from industrial leather manufacture, are mixed together with synthetic thermoplastic or thermoset polymeric resins as a base material, in order to compound a mixture which is able to undergo an extrusion molding process or any other conventional molding process to render solid shaped articles or coatings providing a leather-like surface and enhancing the physic-mechanical properties with respect to that of natural leather or the resins alone. The leather or collagen powder can impart an appearance, feel, and functions resembling those of leather, to a covering layer or molded article formed together with a synthetic resin. To meet this requirement, various proposals have been made, as for instance in patent EP0421450, in which a collagen powder such as a leather fiber powder or a leather powder formed by pulverizing leather scraps is used together with a synthetic polymeric resin such as a polyurethane resin, a polyester resin, a polyacrylic resin, a polyvinyl chloride resin or a polyolefin, or a synthetic rubber such as an SB rubber, to form a covering layer on the surface of an automobile interior trim, a construction interior material, furniture, etc, or to form a molded article such as a steering wheel cover of an automobile, whereby performances resembling those of natural leather are imparted thereto.

Some other examples of the prior art set forth above, and using either thermoplastic or thermoset resins can be found in patents: JP62181741, JP63099914, JP1156047, JP3124800, JP3195800, JP4226538, EP0470399, JP5132868, JP5222681, JP6017378, JP6330472, JP9104841, JP10212675 and U.S. Pat. No. 6,800,384.

In this particular industry, some very important advances in the manufacture of leather-like surface coverings or molded articles would lie on the possibility of lowering production costs and moreover making the products become edible, fully biodegradable in the short or medium term and recyclable, by suppressing the need of using slowly or non biodegradable synthetic resins.

In the light of these facts, after an extensive investigation and trials, the authors of the present invention have now surprisingly found that some proteins can exhibit a thermoset behaviour when, an essentially dry protein is combined with an essentially anhydrous alcohol and submitted to a discrete amount of heat, that is, a moderate elevation of temperature during a relatively short period of time.

Further, it has now been surprisingly found in accordance with the present invention that when a powder of a dry and finely ground protein-rich raw material (the particle size being preferably less than 50 μm) from which the water has been thoroughly removed or at least with such a low residual content of water that avoids this water to be available for taking part in the process, is homogeneously mixed with a certain amount of an anhydrous and liquid alcohol at environmental temperature, in such an extent that at least a self-cohesion of the mixture is reached, and a plastic moldable mass is obtained, such described mass can perform as a thermoset material, and can be thermally inducted to set in some few seconds by the addition of certain amount of heat.

This surprising thermosetting property brings about outstanding advantages in the field of protein-based biodegradable and/or edible solid shaped articles manufacturing. One of the main advantages is the great simplicity of both the compound formulation and the process for carrying out its transformation into a solid object. This advantage along with the lower energetic cost of the process, as compared with thermoplastic processing, makes this technique very useful to transform highly proteinaceous materials into edible and biodegradable utilities.

Particularly, the present invention has the advantages of a) simplifying the manufacturing process for leather-like coverings and molded products manufacturing and, therefore, allowing to reduce production costs, since it cheapens the equipment and facilities, shortens the process times and reduces the expenditures for raw materials and energy, b) rendering biodegradable recyclable and edible molded articles which are suitable to substitute many of those manufactured on the basis of synthetic resins, c) incorporating advantageous physical and mechanical properties as for instance good moisture absorption and release, viscoelasticity, thermosealability and the ability of being transformed into shaped articles like a thermoplastic. Particularly, products obtained of setting collagen compositions will not shrivel or deform after extreme folding and, after pressing, twisting, stretching or squeezing, they always recover their original shape.

OBJECT OF THE INVENTION

Therefore, the present invention has the object of obtaining a biodegradable protein based thermoset composition comprising a homogenous mixture of an essentially dry protein or protein-based powder and an anhydrous and liquid alcohol.

Another object of the invention is to provide a method to obtain said biodegradable protein based thermoset composition.

Finally, another object of the invention is to provide a method to obtain solid biodegradable shaped bodies formed from said compositions, and the bodies obtained thereof.

DESCRIPTION OF THE INVENTION

The present invention provides a biodegradable protein based thermoset composition comprising a homogenous mixture of an essentially dry protein or protein-based powder and an anhydrous and liquid alcohol.

In one embodiment of the invention, the composition contains a 30-90% w/t of the essentially dry protein or protein-based powder and 70-10% w/t of an anhydrous and liquid alcohol, preferably 40-80% w/t and 60-20% w/t, and more preferably 70% w/t and 30% w/t respectively.

As used herein, the wt-% of the components of the composition is based on the total weight of the composition.

A wide range of primary and secondary alcohols are suitable to compound these protein-based thermoset compositions, although much of them have important practical limitations owing to the fact that most of the liquid anhydrous alcohols have not the sufficient viscosity as to give plastic and moldable dough-like mass, and many of them are not capable of acting as solvents for certain plasticity improvers additives such as gums at any temperature. Suitable and gum compatible (under the sense of solubility) alcohols include those polyols and low molecular weight alcohols which are liquids at anhydrous stage, such as glycerol and ethylene glycol.

Therefore, in another embodiment of the present invention, the alcohol used to compound the protein based thermoset composition is selected from ethylene glycol and glycerol. In a preferred embodiment, the alcohol is glycerol.

In a further embodiment, the composition of the present invention can be formulated with one or more animal, plant and microbial derived proteins and combinations thereof.

In a particular embodiment, suitable plant-derived proteins include, but are not limited to soya, gluten (gliadin and glutenin), zein, hordein, kafirin, avenin, legume, alfalfa protein and other proteins from vegetable seeds such as protein isolated from cottonseed, sunflowers seed, lupinseed and protein hydrolyzates of any plant derived protein.

In another particular embodiment, animal-derived proteins that are suitable for use in the present composition include, but are not limited to caseins or whey proteins derived from milk, albumin derived from blood or egg, egg white gelatine, collagen, gelatine, keratin, elastin protein hydrolyzate and other comparable protein-containing substances, and combinations thereof.

In a further particular embodiment, proteins produced by microorganisms are suitable to be part of the compositions according to the present invention. One typical example is yeast protein. However, the micro organism-derived proteins are not limited to that example.

In a preferred embodiment of the invention, the protein used in said thermoset composition is collagen. To yield final products with excellent leather-like feel and touch, and a satisfactorily smooth surface covering or molded article the particle size of the collagen powder must be small. Therefore, in a particular embodiment, the collagen has an averaged particle size in the range of 2-1000 μm, preferably, 10-100 μm and more preferably 10-40 μm.

The process for the preparation of a collagen powder is not particularly critical and is not the object of the present invention. However the resulting collagen must be not degraded beyond a certain point, so that in a preferred embodiment, the molecular weight must be at least of 500 KD. Examples of different procedures to obtain collagen powders can be found in patents JP62181741, EP0421450, JP7070600, JP8027035, JP8259999, JP9302400, JP10025500 and US2004187794.

For example, the collagen powder can be prepared according to the following preferred process, though other processes can be adopted.

In practice and for industrial purposes bovine hide or porcine skin are the collagen sources of choice. This does not exclude other tissues coming from other animals. The use of a tissue mainly based on fibril forming collagen(s) is the only requirement.

However, as a raw material of collagen to be used in the invention, split corium is preferred. The split corium can be obtained from a fresh raw hides or salted hides of animals such as cows, sows and steers. Such split corium primarily comprises insoluble collagen fibers, and it is obtained by splitting the raw hides to remove the upper layer, called epidermis and the subcutaneous layer which is adhered beneath the corium.

In general, the starting material will not be used "as is", but it will be purified by mechanical and/or chemical treatments. Thus the collagen will be submitted to different degrees of purification and, consequently it will also suffer diverse degrees of hydrolysis.

In order not to blow the scope of this paper, the essentials of the present invention will be explained on the basis of limed bovine hide splits which are readily available from tanneries and generally used in collagen sausage casing manufacture or in the gelatine industry. However, by no means the invention is limited to exactly that starting material.

The starting material is first minced by means of adequate equipment known in the art of collagen sausage casing manufacture to a particle size of about 2 mm. The resulting minced material, which shows little granules, is air dried at a temperature equal to or higher than the denaturation temperature of the collagen until the complete cross section of the individual granules is dry and brittle. Brittleness is a favourable prerequisite for milling the granules into a sufficiently finely ground powder. Therefore, drying at elevated temperatures was found to be favourable as compared to drying at ambient temperatures (e.g. 20° C.), as the granules dried under mild conditions still show a fibrillar structure, which does not concede the required degree of brittleness to the particles although the are dry. It seems necessary to denature the material by drying it at elevated temperature (above the denaturation temperature of the material) in order to achieve brittleness. With such brittle material a collagen-based powder can be prepared having an average particle size between 10 μm and 100 μm. Collagen-based finely ground powders with a suitable particle size distribution can be achieved using a turbo rotor mill (TRM, Görgens Company, Germany).

In a preferred embodiment, as a result of this procedure, the water is thoroughly removed from the collagen to obtain an anhydrous collagen or at least a collagen with a content of less than 15% of water that avoids this water to take part in the process.

Although the material present in a powder produced according to the description of above consists of collagen which is partially or completely denatured, so that from a puristic standpoint the material should no longer be simply termed "collagen", for the sake of simplification the notion "collagen" will be further used throughout this document.

In a further embodiment of the invention the protein or protein-based powder used in the thermoset composition may be a combination of collagen and one or more protein selected from plant, animal or microbial derived proteins and combinations thereof, which an averaged particle size no bigger than that of the selected collagen powder.

In another embodiment, these thermoset compositions can additionally comprise other additives. In a particular embodiment, these additives are selected from plasticity improvers, cohesiveness improvers, flowability improvers, nutritional agents, hygiene additives, structure reinforcers, crosslinkers, colorants, flavoring agents, scents, preservatives, blowing agents and lubricants, defined as follows:

Nutritional Agents:

All pet animals need vitamins and minerals in proper amounts and ratios for optimum health. The nutrient ingredients of the collagen-based molding thermoset composition can include vitamins and minerals, as for example vitamins from groups A, B, C, D, E, K, H etc. and minerals selected from sodium, calcium, phosphorus, potassium, magnesium, iron, zinc, manganese, iodine, selenium and cobalt.

Hygiene Additives

Hygiene additives used in the protein-based compositions of the present invention include anti-tartar agents and fresheners to help, in the case of some edible or chewable pet articles, keep the animal pet's teeth and bones strong and to promote good oral hygiene. Hygiene additives can include calcium pyrophosphate, sodium tripolyphosphate, zinc citrate, and calcium hydrogen phosphate as cleaning abrasives to help cleaning animal pet teeth. Hygiene additives also include fresheners, such as dementholized peppermint oil, spearmint oil, sorbitol, and sorbitan.

Plasticity, Cohesiveness and Flowability Improvers

Some substances can be used not only to improve certain mechanical properties of protein-based composition such as plasticity, cohesiveness and elasticity which enables them to be manipulated and molded, but also to lower the viscosity of formed dough what allows those compounds to run processes with much lower energetic requirements and simple equipments that those used for thermoplastic materials. In addition, molded articles gain in other properties related with textural and organoleptic features, in the case of some edible or chewable articles which increase the animal acceptancy; but also are improved some processing properties, such as foaming performance. Typical modifiers which can be used in the present invention include synthetic polymers, such as natural synthetic or bacterial fermentation derivative gums which are hydrophilic and soluble in those selected alcohols such as carragenan, xanthan gum, gellan gum, glucomanan, honeybeen, agar, furcelaran, pectins, Arabia gum, goma tragacanto, caraya gum, dextrin maltodextrin etc.

Structure Reinforcers

The composition may also include a filler to provide structural reinforcement and to reduce product costs. When included, the composition may contain about 1-25 wt % of a filler, preferably about 5-20 wt %, preferably about 10-15 wt %. Preferably, the filler is a cellulose derivative, or a cellulose fiber, a native (unmodified) starch and a chemically or physically-modified starch.

Crosslinkers

Crosslinkers may provide a higher degree of mechanical strength to the final articles prepared from the composition according to the invention. Examples of useful crosslinking agents ("hardeners") which may be added in the approximate amount of from 0.05 to 5% by weight, include, but are not limited to aldehydes like formaldehyde, dialdehydes like glutardialdehyde or glyoxal, modified starch, transglutaminases etc.

Colorants

The compositions may further include a coloring agent as desired. Coloring agents suitable for use in the present compositions include, but are not limited to, synthetic dyes, natural coloring agents such as chlorophyll, xanthophyll, carotene, curcuma, cochenille and indigo; typical food colorants like annatto, carmin, erythrosine, tartrazine, allura red, sunset yellow, and metallic oxides such as iron or titanium oxides. The coloring agent may be included in the composition at a concentration of about 0.01 to 10 wt-%, preferably about 0.5 to 3 wt-%.

Flavoring Agents and Scents

The flavorings that can be used include those known to the skilled artisan, such as natural and artificial flavors. These flavorings may be chosen from synthetic flavor oils and flavoring aromatics, and/or oils, oleo resins and extracts derived from plants, leaves, flowers, fruits and so forth, and combinations thereof.

Preservatives

A compatible antimicrobial agent such as a fungicide or bactericide may also be included in the composition in an amount effective to prevent growth of microorganisms in or on the compositions or an article formed from the compositions which are subject to this invention. Dog food manufacturers use several antioxidants to prevent degradation of fat-soluble vitamins and to prevent spoiling of foods. Preservatives used in connection with the present invention can also include, but are not limited to propionic or sorbic acid and/or their calcium and potassium salts, parabens, benzoic acid and/or benzoates etc. The composition may include about 0.05-0.3 wt-% of preserving agent.

Blowing Agents

A blowing agent is preferably used to form low ratio expanded foam products with the collagen-based thermoset compositions within the scope of the present invention. Chemical blowing agents are for example hydrocarbons, butanes, n-pentanes, hexanes, chlorofluorocarbons, or combinations thereof. As chemical blowing agents are more difficult to handle than the physical ones, the latter are preferably used in the process. The physical blowing agent can also include a compressed gas such as nitrogen or carbon dioxide. When a compressed gas is used, it can be mixed and dispersed in the collagen-plasticizer/additives composition.

Lubricants

The composition may contain a minor but effective amount of a lubricating agent to provide a mold- or dye-lubricating effect when the composition is molded into the desired article, for example, by aiding in the release of the molded article from the mold. Water-insoluble lubricants may also increase the water-resistance of the products. Examples of suitable lubricants that may be used in the compositions, either alone or in combination with another lubricant, include, but are not limited to: soybean oil, rapeseed oil, sunflower oil, palm oil, phospholipids such as lecithin etc. The amount of lubricant included in the composition is about 0.1 wt %-10 wt %, preferably about 0.5 wt %-5 wt-%.

In a particular embodiment of the invention, the additive used in the thermoset composition is a natural, synthetic or bacterial fermentation derivative gum, which is soluble in the alcohol, as a cohesive improver.

The present invention also provides a method to obtain said biodegradable protein based thermoset composition. This method comprises:

a. premixing the alcohol with all those anhydrous components other than protein which are soluble therein to obtain an homogenous anhydrous fluid fraction, under controlled conditions of moisture and temperature, maintaining the mix temperature below the setting temperature of the thermoset composition; and b. premixing the dry protein powder under the same conditions of step a) with all those anhydrous components other than the proteins which are not soluble in the fluid fraction obtained in step a) to obtain a dry fraction; and c. mixing up, under the same conditions of step a) the fluid and dry fractions obtained respectively in steps a) and b) until a homogenous and shelf-cohesive mass is obtained.

The final composition is therefore compounded in a mixer by kneading the premixed ingredients along with the protein powder together, avoiding the absorption of water and so preventing the protein from swelling, until the components are thoroughly dispersed and forming a homogeneous plastic dough-like mass. The plasticity and cohesiveness of the mass can be enhanced by the addition of some modifying agents.

In a particular embodiment, this method may consist just on mixing and kneading all the ingredients together under controlled conditions of moisture and temperature until a virtually homogenous mass is achieved, and a self-cohesive mass is obtained.

In one embodiment of the invention, the temperature of the process of step a) is maintained below 30° C., preferably below 20° C. and more preferably below 15° C., and under vacuum conditions.

In the light of the method described above, in a preferred embodiment, a collagen-based thermoset composition is obtained. The minimum requirement is firstly to mix a finely comminuted collagen dry powder with a sufficient amount of glycerol as to form a self-cohesive mass, that is, the whole anhydrous collagen fraction must be impregnated in the fluid anhydrous alcohol fraction in order to provide a minimum of coherence of the individual particles, since the fluid fraction also acts, temporally, as a binder before the thermosetting reaction and, secondly, prevent the components from taking water during and after the process.

Given a certain amount of alcohol for a determined amount of collagen powder, the smaller the particle size, the more cohesive is the resulting mass and the better is its plasticity, what also leads to some better textural and mechanical properties of the final product.

It is of a determinant importance that during the thermoset compounding, the temperature can be controlled to prevent the mass from reaching the thermosetting temperature. Since the shear and friction forces developed during the kneading process tend to elevate the mass temperature, it will be necessary to cool the same by means of conventional methods at or under 10° C.

Although this basic compound is readily suitable to be set into a solid stage by increasing its temperature, that is, to perform as a thermoset, for practical purposes, the cohesiveness given by the interaction of both the liquid and the solid phases is not sufficient as to avoid a breakage of the mass continuity when this is submitted to a plastic deformation, what occurs for instance when the mass is driven throughout an extrusion process. Upon casting an extruded film or body the apparently plastic mass can suffer an imperceptible solution of continuity before the setting step and, as a consequence, the further occurrence of breakages or weakening points.

In order to obtain a more cohesive, more plastic and better flowable dough-like mass capable of not crumbling as the compound is submitted to either type of conventional molding processing, it is necessary to increase the stickiness of the fluid fraction, either by using a stickier anhydrous alcohol, or by adding a polysaccharide gum which can get dissolved in the alcohol to render a stickier and more flowable medium wherein dispersing the protein particulate, or a combination thereof. In such a latter case, the fluid fraction of future thermoset composition must be previously mixed separately, apart from the collagen fraction, by means of stirring and heating when needed, for every component to get dissolved and/or homogeneously dispersed with each other. If there has been the need of heating the mixture, it will be then necessary to cool the premix below the setting temperature of protein thermoset composition before the unification of the mixture with the protein, to prevent a premature setting reaction. If necessary, the mixture will be compounded into a deaireated container in order to avoid the formation of air bubbles.

Within this premixing step of the anhydrous fluid fraction, many other additives can be added, as will be mentioned hereinafter, whose amount and combination will depend on the kind of final product and expected properties.

Nevertheless, some of the solid additives, though very finely powdered, as they are customary in the market, are unable to get dissolved in any of the components of the fluid premixed fraction. In such a case, they can be premixed along with the protein powder to yield an anhydrous powdered fraction which contains a macroscopically homogeneous mixture of insoluble substances. This operation can be easily made in a single stationary mixer.

Once the fluid fraction has been made, the following step will be to compound the mixture of fluid fraction with the dry fraction, i.e. protein powder or the protein/insoluble solids powdered fraction. This can be made in a stationary mixer or in a continuous mixing device, namely a single screw refrigerated extruder, equipped with side feed hoppers allowing, in an independent way, the feeding of the solid premix and the addition of variable amounts of fluid premix by means of metering devices or pumps, and wherein the temperature distribution along the extruder, pressure, screw speed and configuration, feed rate of the ingredients, and throughput rate can vary.

It must be stressed that the extruder, which is customary provided with a single screw, is a mixing device which is not intended to impart high pressure to the process but only as much as necessary to promote the transport of the plastic compound and to overcome the resistance generated by the dye at the outlet side. At the same time, an excessive elevation of the temperature must be avoided by means of a cooling system.

In the extruder, the action of the rotating screw will mix the ingredients and force the mixture through the sections of the extruder with sufficient pressure as to allow the plastic flow to be discharged at the outlet port of this device.

The present invention also provides a biodegradable protein based thermoset composition obtained by said method.

The present invention further provides a method to obtain a solid biodegradable shaped body formed from said composition that comprises:
 i. forming a shaped mass with the thermoset mass, obtained in the method above, by conventional artisan or industrial methods, and
 ii. submitting the shaped mass to a controlled source of heating to elevate the temperature to more than 40° C. for a sufficient period of time to set the mass and becomes a solid body.

In one embodiment, the temperature of step ii) is between 60 and 180° C., preferably between 80 and 160° C.

The thermosetting reaction takes place once the thermosetting temperature has been reached, which in turn depends on the type of protein/alcohol combination. The time required for the thermosetting reaction depends on the shape and mass of the molded object, since the whole of the shaped body must reach the thermosetting temperature.

In one embodiment the conventional artisan or industrial method include, but are not limited to cool extrusion, coextrusion, compression molding, injection molding, blow molding, rotation molding, transfer molding, vacuum forming and pressure forming.

In another embodiment, the source of heating includes, but is not limited to field of microwaves, a field of high frequency electromagnetic waves, infrared rays, electric oven and any other conventional heating method.

In the light of this method, the present invention provides a solid biodegradable shaped body obtained by said method. Said bodies, depending on both the base protein, or protein mixture from which it is derived, and the relative amount of alcohol and additives, has a wide range of characteristics.

The plastic thermoset mass can be shaped in any predetermined form, either by extrusion or injected into a mold, and can be readily set through the application of a certain amount of heat during a short period of time (some few seconds) which enables it to turn into a solid body or article through a very simple process.

In a particular embodiment, said body is a flat or tubular film.

The plastic composition may either extruded through the discharge port or die, into the air or other gaseous medium by pressing the same through one or several slotted dies, preferably dies with a straight or circular slot, what provides of flat or tubular endless films. As the films or tubes come out from the outlet port of the extruder, they are quickly set by passing them, for example trough a microwaves generator, a tunnel of IR beam, a tunnel of high frequency electromagnetic energy, a conventional oven or any other heating source.

In a preferred embodiment, said tubular or flat films are thermosealable.

The plastic composition may be also used in molding processes to form a biodegradable protein-based shaped article with a smooth leather-like surface. In this second case, the molds containing the thermoset composition are heated to quickly reach the thermosetting temperature, and after some few seconds at this temperature, are opened to liberate the formed solid.

The plastic composition may be processed into these solid articles, for example, by injection molding, wherein the plastic thermoset composition is forced into a mold and maintained under certain temperature by conventional heating methods until the setting of the mass; by compression molding, wherein direct pressure is applied using a hydraulic press on an amount of the composition contained in a cavity and then applying a certain amount of heat to set the shaped cake; by blow molding, wherein a tube of the thermoset composition is extruded through an annular nozzle and air pressure is applied to the inside of the freshly formed tube to prevent it from collapsing, thus forming a hollow article like a bottle or a tube which is passed through a source of heating; and by any other method capable of conferring a stable shape to the plastic thermoset composition while setting.

Still another alternative is the extrusion of the thermoset composition, pressing out of it through a straight slotted die, to obtain a primary flat film which is rolled out, in a suitable system of refrigerated and/or progressively more heated calenders, while its setting process, keeps pace with the heat increasing, to adjust a desired film width and wall thickness, as well as excellent appearance and smooth leather-like surface which does not show any tendency to shrivel even after extreme folding. The thermoset composition may be also extruded through an annular die to form a tubular film by means of blow molding.

In a particular embodiment, the compositions used in molding processes may be useful in molding articles such as fishing baits or lure capable of attracting fish. In another particular embodiment the compositions are used in other molding articles such as chewable pet toy and/or pet treat and other articles made to mimic natural animal bone shapes of various shapes, dimension and sizes. The texture, pliancy, and consistency of the molded articles encourage gnawing, making them a delight for dogs and pet animals. The gnawing action allows pets to softly penetrate the chewable pet toy, promoting clean, healthy teeth and fresh breath.

Further, a great number of different utilities can be obtained that, owing to the mechanical properties, biodegradability and potentially edible condition of this protein thermoset composition could replace those made up of synthetic, non or slowly degradable polymers in the fields of packaging, amusement articles, etc.

In a preferred embodiment, solid articles obtained can perform as a thermoplastic precursor material and after being ground into small particles, i.e. a pellet, it can be submitted to a thermoplastic extrusion process, under high pressure and temperature conditions, and performed as a thermoplastic.

In another particular embodiment, the biodegradable shaped body obtained is a leather-like surface product (layer or sheet or molded articles), and may be molded under the shape of covering layer on the surface of an automobile interior trim, a construction interior material, furniture or a precision machine, or a molded article such a steering wheel cover of an automobile, whereby performances resembling those of natural leather are imparted thereto.

The resulting solid and shaped articles thereby obtained show excellent appearance, feel, and functions resembling, those of a leather-like covering layer or molded article formed, for example, of collagen together with a synthetic resin, as well as outstanding mechanical properties characterised by a good flexibility, good tensile and tearing strength, abrasion resistance and a noticeable ability to recover its original shape after suffering a mechanical deformation.

In a particular embodiment, all these kinds of solid bodies can be submitted to foaming performance to obtain foamed articles such a loose fill packing pellet, containers, etc. . . .

In another particular embodiment, every component of the composition is an edible substrate.

In a further particular embodiment, the protein or protein-based powder comprises collagen. This collagen protein composition may be transformed, in a preferred embodiment, into a molded or coated utility with a leather-like surface. According to the method above, 100 parts of collagen powder (Kollagenpulver provided by ForschungsInstitut fur Leder und Kunststoffbahnen) with a molecular weight of at least 500 kD and a particle size of less than 50 microns is mixed with 60 parts of a premixed fluid fraction consisting in 92 parts of anhydrous glycerol (Panreac reactives) and 8 parts of xanthan gum.

The food grade xanthan powder (Keltrol 415, CPKelco; loss on drying at 105° C. for 2½ hours=6-14%) is homogeneously dispersed by stirring along with glycerol and then, by heating and stirring the mixture to about 40° C. the gum dissolves giving a very viscous and sticky gel. This practically anhydrous premix is then placed in a hopper from where it is pumped at the convenient rate to a continuous refrigerated single screw mixer, the temperature of which is maintained at 14° C. and to where the collagen powder is entering trough its respective metering point. The mixing process must prevent moisture from entering. This process can last from seconds to some few minutes until the compound acquires the optimal degree of homogeneity and flowability with the maximum cohesiveness. Then, the plastic thermoset compound is allowed to flow out from the extruder at the outlet port through a straight slotted die, thus forming a flat horizontal thick sheet which is cast onto the first of a series of calendars which will conduct, while squeezing and expanding, the sheet, until forming a finer and wider film, which finally lies down on a conveyor belt where it is transported to enter the tunnel of a microwaves generator type MDBT of Linn High Term GmbH (Eschenfelden, Germany) to be quickly set, giving a sheet with smooth feel and leather appearance.

The preferred heating technique is the use of high frequency electromagnetic energy. The application of such energy having a frequency of about 1 to about 100 megahertz to the mixture will uniformly heat the mixture rapidly to the desired temperature without forming undesirable hot-spots. The actual power employed will be determined by the amount of material being heated.

The residence time in the heating zone is dependent on the temperature achieved. It is desired to have as short a time as possible in order to prevent undesirable denaturation of the protein. A residence time of a few seconds at 90° C. is achieved using electromagnetic energy as the heating source.

In another preferred embodiment, a molded pet chew in the form of a dog bone is formed from a powdered wheat protein, namely wheat gluten, which is mixed up with a premix of anhydrous glycerine and xanthan gum. Xanthan gum is soluble, under heating conditions, in glycerine. A small percentage (around 0.8 to 1.6 wt-%) on the weight basis of glycerine is necessary to render a very viscous and sticky colloid. The premix will be preferably done by firstly dispersing the dry xanthan powder in the anhydrous glycerine and then, heating the dispersion within a field of microwaves, until reaching the dissolving temperature of the polysaccharide. The colloid is then transferred into a vacuum flask to be energetically stirred during some few minutes, while the temperature of said colloid is maintained below 30° C. until the maximum viscosity, for this temperature, is reached. The following step will be to mix the dry gluten with the viscous premix by kneading the mixture until a homogeneous dough-like mass is obtained. An ideal ratio protein: premix is for instance 10 parts of protein to 6 parts of premix, but a wide range of ratios are possible depending of the desired dough viscosity and the texture and mechanical properties which are sought in the final article. The components of the dough are kneaded in a simple mixer and then transferred to the hopper of a single screw refrigerated extruder to be injected into a resin mold with a cavity in the form of a dog bone. The mold can be heated by different methods, but preferably by means of a field microwaves with a controlled power and time. The resultant molded dog bone has a smooth surface and very sweet cookie-like aroma. It is very chewy and nutritious, flexible and elastic and it has a sufficient lasting as to perform as a good dental cleaner while massaging the gums of the pet.

In still another preferred embodiment, the components of the dough are separately fed to a single screw refrigerated extruder, the rate of premix being adjusted to the protein flow, wherein they are mixed and kneaded, and continuously driven to the outlet port to be extruded through a die with circular cross-section and is continued by a short and heated sleeve of a non reactive material such as stainless steel, or a tubular piece of nylon which enters the electromagnetic field of a microwaves tunnel, the power of which is adjusted with respect to the speed, and consequent dwelling time, of the strand inside it. As soon as the strand is set and turned solid, it is conducted towards a cutting device to be transformed into short segments (pellets) which can be furtherly submitted to a conventional extrusion-cooking process and perform as a thermoplastic.

The following examples are not meant to limit the scope of the invention that has been set forth in the foregoing description. It should be understood that many variations and modifications may be made while remaining within the spirit and scope of the invention.

Example I

Preparation of a Thermoset Composition Based on Collagen

First Step: Preparation of Collagen Powder.

10 kg of 10 cm×5 cm sized pieces of limed splits or pelts was soaked in 30 l of water at room temperature in a tanning drum. The material was completely saturated in the course of 24 hours. Then the soaking water was drained off and the rehydrated material was cut into pieces having a diameter of about 10 mm in a first mincing step. To achieve this degree of pre-comminution, the rehydrated raw material was treated in a cutter during 1 minute. The pre-minced material discharged from the cutter was transferred into a passing machine equipped with a breaker plate having holes with a diameter of 2 mm. The resulting minced material showed little granules.

The granules obtained were stacked up in a layer of 3 cm on plates and air dried prior to put them in a hearth-type furnace at 80° C. After 16 hours the complete cross section of the stacked granules was virtually dry. This dried material was brittle, which is a prerequisite for grinding it into a fine powder.

Via a twin screw feeder the brittle granules were fed into the hopper of a Turbo-Rotor-Mill (TRM; Görgens Company, Germany). The particle size distribution can be varied by setting different rotation speeds of the turbo rotor. At a flow-rate from 200 g/min through the mill and a rotation speed of 4221 rpm of the turbo rotor the average grain size of the powder was found to be 40 μm.

The powder was forwardly prevented from taking moisture by storage in tight containers.

Second Step: Compounding the Thermoset Composition

The collagen powder was directly mixed with the corresponding amount of anhydrous glycerine, and the resulting mixture was kneaded inside the refrigerated mixing apparatus, under vacuum conditions, to avoid air bubbles formation and to prevent the moisture from entering. The resulting mass was stored under cool, dry and tight conditions until the processing of the same.

Example II

Preparation of a Leather-Like Sheet Based on Collagen

In a mixing device, 100 parts of a dry collagen powder prepared as is described in example 1, with a molecular weight of at least 500 kD and an averaged particle size of 40 μm was mixtured with 60 parts of a fluid fraction consisting of anhydrous glycerol (Panreac reactives). This practically anhydrous mixture was then placed in a hopper from where it was pumped at the convenient rate to a continuous refrigerated single screw extruder, the temperature of which was maintained at 14° C. Both the mixing and the extrusion processes must prevent the moisture from entering. Then, the plastic thermoset compound was allowed to flow out from the extruder at the outlet port through a straight slotted die, the dimensions of the slot being 150 mm×3 mm; and thus forming a flat horizontal sheet which was continuously cast onto a conveyor belt, by means of which it entered the tunnel of an open microwaves generator type MDBT of Linn High Term GmbH (Eschenfelden, Germany) at such a speed that the dwelling time inside the tunnel was 12 seconds and wherein the power of microwaves was adjusted for the sheet to reach a maximum temperature at the end of tunnel of 80° C., what ensures the complete setting of the thermoset compound, giving a sheet with smooth feel and leather appearance. After cooling, the sheet showed excellent flexibility and good strength to the breaking point.

The application of a constant stretching force caused the material to slowly elongate and after being liberated of such an effort, the material slowly recovered its original dimensions and shape. This material exhibits the ability of not to shrivel or to deform after an extreme folding and, after pressing, twisting, stretching or squeezing, it always recover its original shape. The material obtained is also thermo-sealable and thermoplastic.

| Ingredients | Weight based parts |
| --- | --- |
| Collagen | 100 |
| Glycerol | 60 |

Example III

Preparation of a Pet Chew Based on Collagen

In a mixing device, a premix binder solution of 8 parts of food grade xanthan gum powder (Keltrol 415, CPKelco; loss on drying at 105° C. for 2½ hours=6-14%) in 92 parts of anhydrous glycerol was formed by stirring the mixture until the gum particles were thoroughly dispersed and then heating the dispersion at 70° C. until the gum was completely dissolved. As the temperature of the solution drops down, the viscosity of the same increased until a gel-like solution was reached. Once the temperature had come at 28° C., 100 parts of collagen powder (Kollagenpulver provided by ForschungsInstitut fur Leder und Kunststoffbahnen) with a molecular weight of at least 500 kD and an averaged particle size of 40 μm were mixed with 60 parts of the premix in a mixer to form a substantially homogeneous dough-like mass with the ingredients distributed substantially evenly throughout. The mixing process must take place in a tight system to prevent the moisture from entering the composition. The composition was then transferred to the hopper of an injecting device, namely a refrigerated single screw extruder, wherein the composition was driven and directly injected into a mold whose cavity had the shape of a dog bone. The mold was a resin-mold which was placed inside a microwaves oven where the power and time is adjusted for the molded composition to reach a temperature of 80° C. Once the temperature had been reached, the mold was removed from the microwaves and opened to obtain a dog bone shaped solid.

| Premix | Proteins | Weight based parts |
| --- | --- | --- |
|  | Collagen powder | 100 |
| Glycerine |  | 59 |
| Xanthan gum |  | 1 |
| Vanillin |  | 1 |

Collagen: (Kollagenpulver provided by ForschungsInstitut fur Leder und Kunststoffbahnen)
Glycerine: Panreac reactives
Xhantan gum: FMC Polymers
Vanillin: Rhodia (Rhovanil)

Example IV

Preparation of a Pet Chew Based on Gluten

The process of the example III wherein the composition was the following:

| Premix | Proteins | Weight based parts |
| --- | --- | --- |
|  | Wheat gluten | 100 |
| Glycerine |  | 49 |
| Konjac gum |  | 1 |
| Vanillin |  | 1 |
| Potassium Sorbate |  | 2 |

Wheat Gluten: General Mills
Konjak gum: FMC Polymers
Potassium Sorbate: Panreac reactives

Example V

Preparation of a Pet Chew Based on Soy Protein

| Premix | Proteins | Weight based parts |
| --- | --- | --- |
|  | Soy P. isolate | 100 |
| Glycerine |  | 59 |
| Konjac gum |  | 1 |
| Smoke flavour |  | 2 |
| Caramel Colour E150C |  | 12 |

Soy protein isolate: Archer Daniels Midland Company
Smoke flavour: Hela Germany
Caramel colour E150C: Sensient Food Colors Germany GmbH

Example VI

Preparation of a Pet Chew Based in Animal and Vegetable Protein Mixture

The process of the example III wherein the composition was the following:

| Premix | Proteins | Weight based parts |
| --- | --- | --- |
|  | Wheat gluten | 50 |
|  | Collagen | 51 |
| Glycerine |  | 60 |
| Carragenan gum |  | 2 |
| Ham flavour |  | 2 |
| Red colour E120-carmine |  | 3 |

Ham Flavour: Hela Germany
Carragenan gum: Premium Ingredients S.L. (San Ginés, Murcia).
Red colour E120-carmine: Sensient Food Colors Germany GmbH.

The invention claimed is:
1. A method to obtain a biodegradable protein based thermosetting composition, consisting in an homogenous mix- ture of an essentially dry protein or protein based powder, an essentially anhydrous and liquid alcohol and optionally one or more ingredients, characterized in that it comprises the following steps:
   a. premixing the alcohol with all those anhydrous ingredients other than protein which are soluble therein to obtain an homogenous essentially anhydrous fluid fraction, under controlled conditions of moisture and temperature, maintaining the mix temperature below the setting temperature of the thermoset composition; and
   b. premixing the dry protein powder under the same conditions of step a) with all those anhydrous ingredients other than the proteins which are not soluble in the fluid fraction obtained in step a) to obtain a dry fraction; and
   c. mixing up, under the same conditions of step a) the fluid and dry fractions obtained respectively in steps a) and b) until a homogenous, plastic and shelf-cohesive mass is obtained.

2. A method as claimed in claim 1, characterized in that the temperature of the process of step a) is maintained below 15° C.

3. A method as claimed in claim 1, characterized in that the thermosetting composition comprises 30-90% w/t of an essentially dry protein or protein based powder and 70-10% w/t of an essentially anhydrous and liquid alcohol.

4. A method as claimed in claim 3, characterized in that the thermosetting composition comprises 40-80% w/t of the protein powder and 60-20%, w/t of the alcohol.

5. A method as claimed in claim 1, characterized in that the alcohol used in step a) is selected from ethylene glycol and glycerol.

6. A method as claimed in claim 1, characterized in that the protein or protein based powder is selected from one or more animal, plant, microbial derived proteins and combinations thereof.

7. A method as claimed in claim 6, characterized in that the protein used in step b) is collagen, having said collagen an average molecular weight of at least 500 kd.

8. A method as claimed in claim 7, characterized in that the collagen has a content less than 15% of water.

9. A method, as claimed in claim 7, characterized in that the collagen powdered has an averaged particle size in the range of 10-100 μm.

10. A method, as claimed in claim 6, characterized in that the protein or protein-based powder is a combination of collagen and one or more protein selected from plant, animal or microbial derived proteins and combinations thereof, which has an averaged particle size no bigger than that of the selected collagen powder.

11. A method as claimed in claim 1, characterized in that the ingredients are selected from plasticity improvers, cohesiveness improvers, flowability improvers, nutritional agents, hygiene additives, structure reinforcers, crosslinkers, colorants, flavoring agents, scents, preservatives, blowing agents and lubricants.

12. A method as claimed in claim 11, characterized in that the ingredient is a natural, synthetic or bacterial fermentation derivative gum, which is soluble in the alcohol, as a cohesive improver.

13. A biodegradable protein based thermosetting composition obtained by the method claimed in claim 1.

14. A method to obtain a solid biodegradable shaped body formed from the composition as claimed in claim 13, characterized in that it comprises the following steps:
   i forming a shaped mass with the shelf-cohesive thermosetting mass, and
   ii submitting the shaped mass to a controlled source of heating to elevate the temperature to more than 40° C. for a sufficient period of time to set the mass and becomes a solid body.

15. A method to obtain a solid biodegradable shaped body as claimed in claim 14, characterized in that the temperature of step ii) is between 60 and 180° C.

16. A method to obtain a solid biodegradable shaped body as claimed in claim 14, wherein the step i) comprises the methods of cool extrusion, coextrusion, compression molding, injection molding, blow molding, rotation molding, transfer molding, vacuum forming and pressure forming.

17. A method to obtain a solid biodegradable shaped body as claimed in claim 14, wherein the source of heating of step ii) is selected from a field of microwaves, a field of high frequency electromagnetic waves, infrared rays and electric oven.

18. A solid biodegradable shaped body obtained by the method of claim 14.

19. A solid biodegradable shaped body as claimed in claim 18, characterized in that said body is a flat or tubular film.

20. A solid biodegradable shaped body as claimed in claim 19, characterized in that said films are thermo-sealable.

21. A solid biodegradable shaped body as claimed in claim 18, characterized in that said body is a chewable pet toy and/or pet treat.

22. A solid biodegradable shaped body as claimed in claim 18, characterized in that said body is a fishing bait.

23. A solid biodegradable shaped body as claimed in claim 18, characterized in that said body is a pellet.

24. A solid biodegradable shaped body as claimed in claim 18, characterized in that said body is a foamed article.

25. A solid biodegradable shaped body as claimed in claim 18, characterized in that every component is an edible substrate.

26. A solid biodegradable shaped body as claimed in claim 18, characterized in that the protein or protein-based powder comprises collagen.

27. A method as claimed in claim 3, characterized in that the thermosetting composition comprises 70% w/t of the protein powder.

28. A method as claimed in claim 3, characterized in that the thermosetting composition comprises 30% w/t of the alcohol.

29. A method as claimed in claim 7, characterized in that the collagen powder has an averaged particle size in the range of 10-40 μm.

30. A method to obtain a solid biodegradable shaped body as claimed in claim 14, characterized in that the temperature of step ii) is between 80 and 160° C.

31. A method as claimed in claim 8, characterized in that the collagen is an anhydrous collagen.

* * * * *